US006967811B1

(12) United States Patent
Codilian et al.

(10) Patent No.: US 6,967,811 B1
(45) Date of Patent: Nov. 22, 2005

(54) DISK DRIVE HAVING FIRST AND SECOND SEEK OPERATING MODES FOR CONTROLLING VOICE COIL MOTOR TEMPERATURE RISE

(75) Inventors: Raffi Codilian, Irvine, CA (US); David D. Nguyen, Fountain Valley, CA (US); Alexander Babinski, Aliso Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/884,559

(22) Filed: Jul. 2, 2004

(51) Int. Cl.[7] .............................................. G11B 5/596
(52) U.S. Cl. ................................................. 360/78.06
(58) Field of Search ........................ 360/78.06, 78.07, 360/78.04

(56) References Cited

U.S. PATENT DOCUMENTS

| | | | |
|---|---|---|---|
| 3,735,219 A | * | 5/1973 | Kahn et al. .................. 318/135 |
| 5,128,813 A | | 7/1992 | Lee |
| 5,557,550 A | * | 9/1996 | Vigil et al. .................. 702/130 |
| 5,594,603 A | | 1/1997 | Mori et al. |
| 2004/0264036 A1 | * | 12/2004 | Ding et al. ............... 360/78.08 |

* cited by examiner

Primary Examiner—David Hudspeth
Assistant Examiner—Mitchell Slavitt
(74) Attorney, Agent, or Firm—Ramin Mobarhan, Esq.

(57) ABSTRACT

A disk drive comprising a first seek operating mode to move the actuator over a seek distance D in a seek time $T_1$, using a first seek profile for minimizing $T_1$, wherein for a first repetitive series of seeks over distance D a servo control system would require a delay time $T_D$ between seeks to control temperature rise in a VCM. A second seek operating mode to move the actuator over the seek distance D in a second seek time $T_2$ using a second seek profile for limiting the temperature rise in the VCM, wherein for a second repetitive series of seeks over the seek distance D, a time average $T_{AVG}$ of the $T_2$ seek times is substantially less than $T_1+T_D$.

17 Claims, 3 Drawing Sheets

DISK DRIVE HAVING FIRST AND SECOND SEEK OPERATING MODES FOR CONTROLLING VOICE COIL MOTOR TEMPERATURE RISE

FIELD OF THE INVENTION

This invention relates to seek time of disk drives. More particularly, the present invention is directed to a system for reducing a seek time penalty due to coil overheating in disk drives.

BACKGROUND OF THE INVENTION

Disk drives are commonly used to store large amounts of data in a readily available form. Typically, the primary components of a disk drive are a head disk assembly and a printed circuit board assembly (PCBA) which, when fixed to one another, form a functional unit that is then connected to a computer. The head disk assembly includes an actuator having a voice coil motor (VCM), a head mounted on the actuator, at least one data storage disk mounted on a spindle motor for rotating the storage disk near the head and a servo control system for moving the actuator to position the head over a desired track so that read/write operations may be performed on the disk.

A widely used measure of performance of a disk drive is the number of I/O operations performed by the disk drive. The quickness of the I/O operations are in turn affected by the seek time of the disk drive which is the time required by the actuator to reposition the head over a desired track. A disk drive having a short seek time will generally be able to access a requested track of data more quickly than a drive having a longer seek time. To achieve the high degrees of actuator acceleration for a quick repositioning of the head, a relatively large current is often required to flow through the VCM.

Unfortunately, when large amounts of current are directed through the VCM, the rate of heat gain caused by the finite resistance of the windings of the VCM coil may exceed the rate of heat loss to the environment. Thus, a rapid succession of seek operations may excessively raise the temperature of the coil. The excessive heat may deform the coil, and cause overmold material to delaminate from the actuator assembly, lose its rigidity and/or outgas particulates into the disk drive enclosure, with deleterious results. Thus, to prevent such damages, the VCM coil must be inhibited from overheating.

Currently, a widely used method is imposing mandatory delay time between successive seeks if the temperature of the VCM rises to above a predetermined temperature threshold. The imposed delay allows for the VCM to cool down via heat loss to the environment. While this approach can effectively prevent the VCM from overheating, the imposed delays degrades the overall seek performance of the disk drive.

Accordingly, what is needed is a reduction in the seek time penalty in the disk drive while effectively preventing the VCM from overheating.

SUMMARY OF THE INVENTION

This invention can be regarded as a disk drive comprising an actuator having a voice coil motor (VCM), a head mounted on the actuator, a disk comprising a plurality of tracks and a servo control system for moving the actuator to position the head over a track. The servo control system comprises a first seek operating mode to move the actuator over a seek distance D in a seek time $T_1$, using a first seek profile for minimizing $T_1$ and wherein for a first repetitive series of seeks over distance D, the servo control system would require a delay time $T_D$ between seeks to control temperature rise in the VCM.

The servo control system further comprises a second seek operating mode to move the actuator over the seek distance D in a second seek time $T_2$ using a second seek profile for limiting the temperature rise in the VCM, wherein for a second repetitive series of seeks over the seek distance D, a time average $T_{AVG}$ of the $T_2$ seek times is substantially less than $T_1+T_D$.

DETAILED DESCRIPTION OF THE INVENTION

Figure 1:
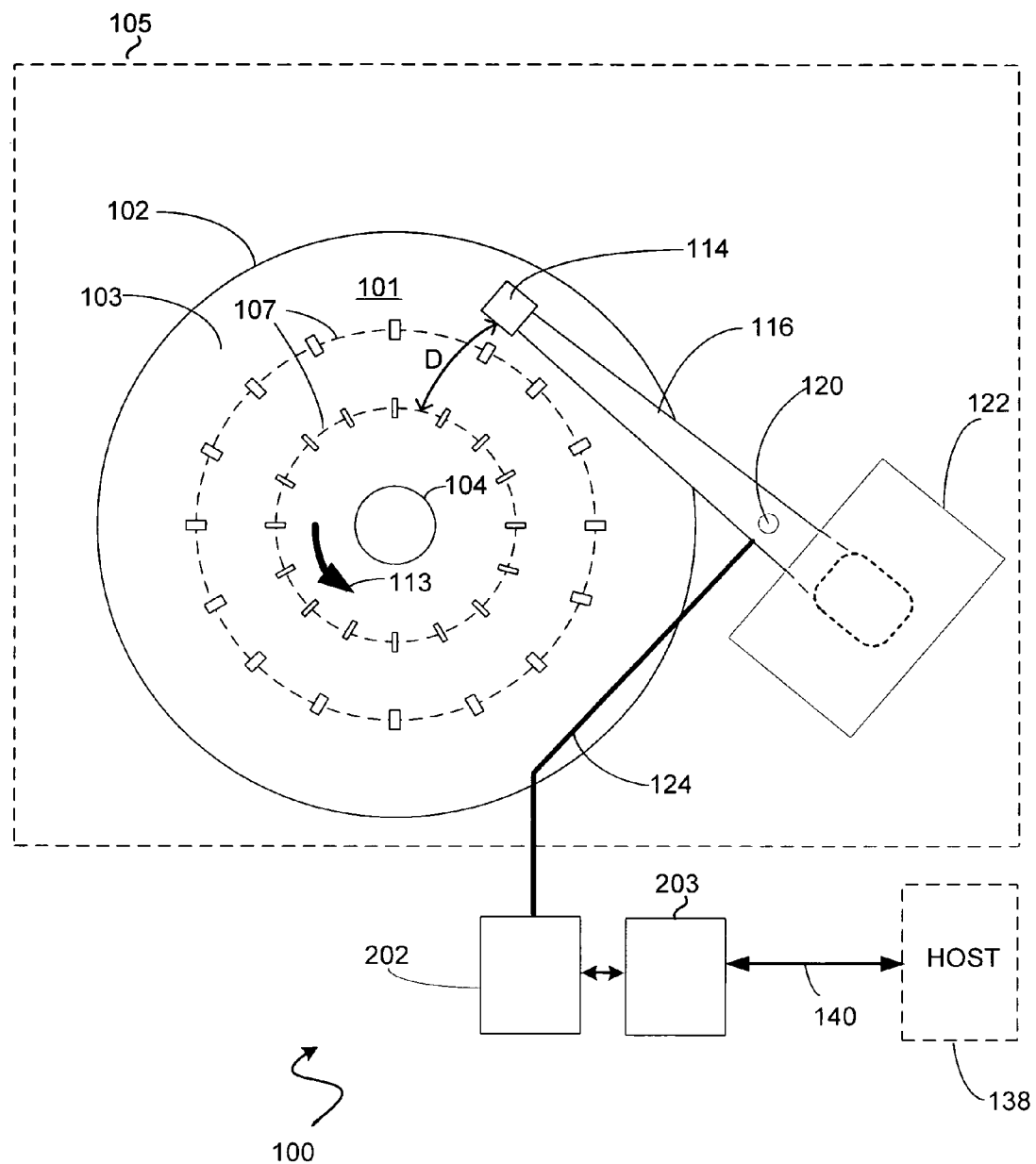
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 having a plurality of tracks 107 formed on each surface 103 of a disk 102. The HDA 105 further comprises a head 114 mounted on a rotary actuator 116 that rotates about a pivot 120 via controlled torques applied by a voice coil motor (VCM) 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 105 to a control system 202 which can control the movement of the actuator 116 for moving the actuator 116 to position the head 114 over a track 107. In addition, the servo control system 202 sends to and receives signals from the head 114 during read and write operations performed on the disk 102. As also shown in FIG. 1, the servo control system 202 is interconnected to the interface control system 203 which is in turn interconnected to a host computer 138 by a bus 140 for transferring of data between the hard disk drive 100 and the host 138.

Figure 2:
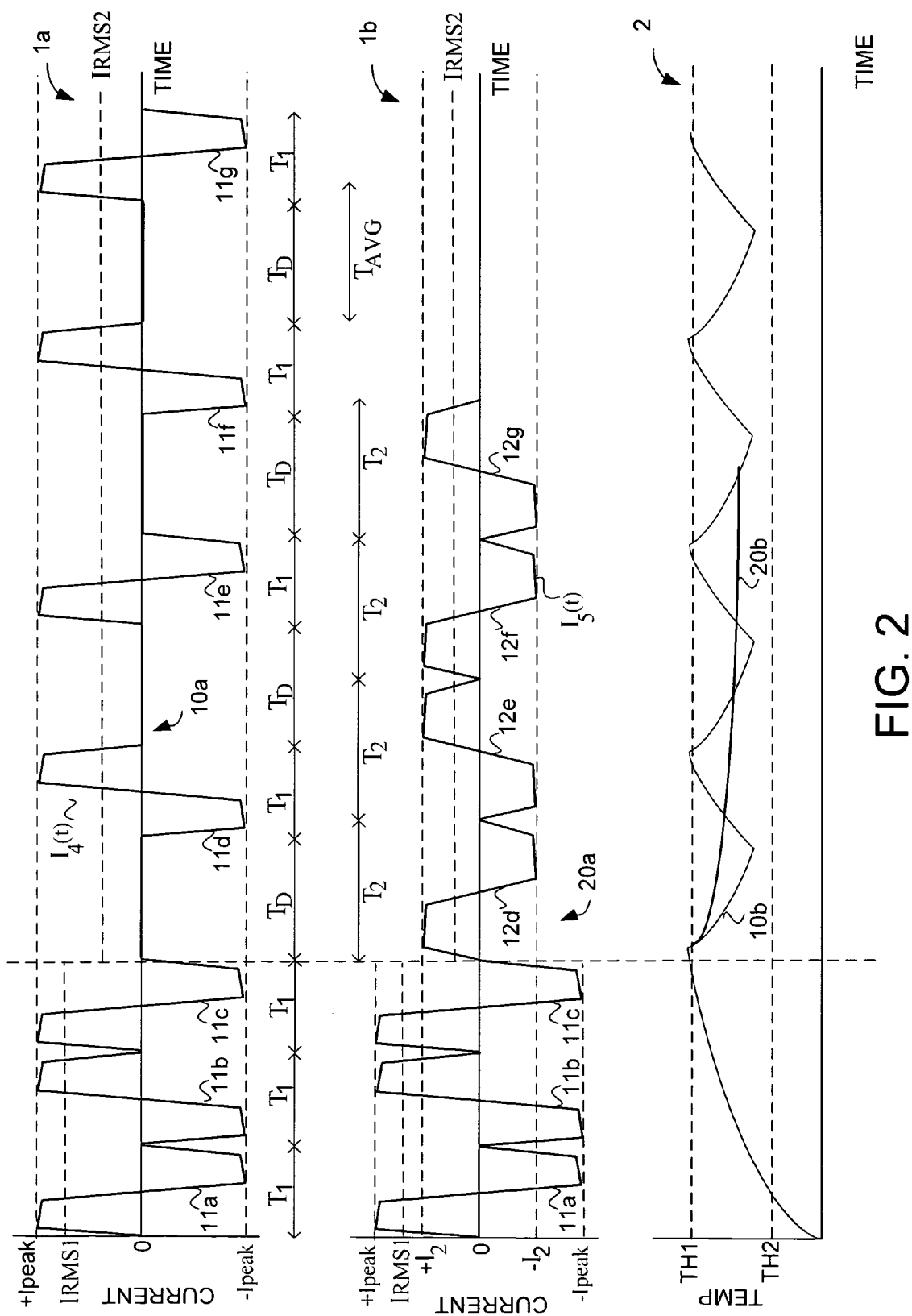
FIG. 2 illustrates temperature and current graphs corresponding to the operating modes of the present invention.

FIG. 2, in conjunction with FIG. 1, illustrates current graphs 1a, 1b and temperature graph 2 corresponding to the operating modes of the servo control system 202 of the present invention. The servo control system 202 comprises a first seek operating mode to move the actuator 116 over a seek distance D in a seek time $T_1$, as shown in graph 1a, using a seek profile 10a for minimizing $T_1$. The seek profile 10a is characterized by an operating current $I_4(t)$ with an amplitude ranging from zero to a predetermined peak amplitude of $I_{peak}$, such as a saturation current. The current $I_4(t)$ is provided to the VCM 122 for a predetermined time period $T_1$ during a seek, such as seek 11a, over distance D. As also shown in graph 1a in conjunction with the temperature graph 2 which maps the rise of the VCM 122 temperature to the seek operations of graph 1a, for a first repetitive series of seeks 11a–11g, once the temperature of the VCM 122 exceeds a predetermined threshold TH1, the control system 202 would require a delay time $T_D$ between seeks, such as between each of seeks 11d, 11e, 11f and 11g, to control temperature rise in the VCM 122. As shown in graph 2 by temperature line 10b corresponding to the temperature of the VCM 122 during seeks 11d–11g, each delay $T_D$ would result in a drop in the temperature of VCM 122 until a subsequent seek operation would again raise the temperature of the VCM 122 to above threshold TH1. As described above, while the required delay $T_D$ allows for the VCM 122 to cool down via heat loss to the environment, it cause an increase in the overall seek time of the disk drive 100.

To minimize the increase in the overall seek time of the disk drive 100 due to delays $T_D$ while also limiting the temperature rise in the VCM 122, the servo control system 202 of the present invention comprises a second seek operating mode to move the actuator 116 over the seek distance D in seek time $T_2$ using a seek profile 20a as shown in graph 1b. As described below and in greater detail in conjunction with FIG. 3, the seek profile 20a is generated based on the seek profile 10a, either prior to the initialization of the disk drive 100 or during the operations of the disk drive 100, such as on the fly. As shown in graph 1b in conjunction with graph 2, using seek profile 20a for a second repetitive series of seeks, such as seeks 12d, 12e, 12f and 12g, over the seek distance D, a time average $T_{AVG}$ of the $T_2$ seek times becomes substantially less than a $T_1+T_D$ of the seek profile 10a shown in graph 1a. As also shown in graph 1b, no delays $T_D$ are required while using the seek profile 20a, and as shown in graph 2 by temperature line 20b corresponding to the temperature of the VCM 122 during seeks 12d–12g, the overall temperature of the VCM 122 still remains below the threshold TH1. Suitably, the servo control system 202 is adapted to switch from the first seek operating mode to the second seek operating modes when the VCM 122 reaches a first predetermined threshold temperature, such as threshold TH1, and to switch from the second seek operating mode to the first seek operating modes when the VCM 122 reaches a second predetermined threshold temperature, such as threshold TH2.

The generating of the seek profile 20a based on the seek profile 10a will now be discussed in greater detail in FIG. 3 in conjunction with FIG. 2. For simplicity of illustration, a single seek, such as seek 12d and 11e, of each of seek profile 20a and 10a, respectively, is selected, and shown in a synchronous fashion in graph 3. It is well known in the art that the rise in temperature of the VCM 122 corresponds to the average power supplied to the VCM 122 by an average current, such as by a root mean square (RMS) current $I_{RMS}$, such as $I_{RMS1}$ or $I_{RMS2}$. In an exemplary embodiment of the present invention, once a desired $I_{RMS}$ profile is selected for a seek profile 10a in disk drive 100, the seek profile 20a is then generated with the first constraint of maintaining the same $I_{RMS}$ profile for both seek profiles 10a and 20a. Thus, in the exemplary seeks shown in FIG. 3, the $I_{RMS2}$ profile remains the same for both seeks 11e and 12d. A second constraint is that the distance D traveled by the head 114 must remain the same for both seeks 11e and 12d. Finally, the velocity of the head 114 at the end of each of seeks 11e and 12d must also remain the same.

To satisfy the constraint of distance D traveled by the head 114 remaining the same for both seeks 11e and 12d, the peak current amplitude $I_{peak}$ of the current $I_4(t)$ corresponding to seek 11e is scaled by a reduction factor $F_1$ to a $I_2$ peak amplitude of current $I_5(t)$ corresponding to seek 12d. In addition, the $T_1$ duration of providing the current $I_5(t)$ to VCM 122 is "stretched" in time by a second factor $F_2$ to a duration of $T_2$ wherein the relation between $F_1$ and $F_2$ are shown by a factor K in the following Equations 1a and 1b:

$$F_1 = 1/(K)^2 \qquad \text{(Eq. 1a)}$$

$$F_2 = K \qquad \text{(Eq. 1b)}$$

wherein K is >=1. Thus the amplitude $I_{peak}$ of the current $I_4(t)$ provided to the VCM 122 is scaled by a reduction factor of $1/(K)^2$ and then "stretched" in time by a factor of K, resulting in the current $I_5(t)$, as shown by the following Equation 1c:

$$I_5(t) = F_1 I_4\left(\frac{1}{F_2}t\right) = \frac{1}{K^2} I_4\left(\frac{1}{K}t\right) \qquad \text{(Eq. 1c)}$$

In this way, the distance D traveled by the head 114 will remain the same for both seeks 11e and 12d. In addition, the end velocities $V_1$ and $V_2$ of the head 114 at the end of each of seeks 11e and 12d respectively, will also remain the same, or at zero, since the end velocity $V_1$ was zero and end velocity $V_2$ is $1/(F_2)$ times $V_1$ and thus also zero.

Figure 3:
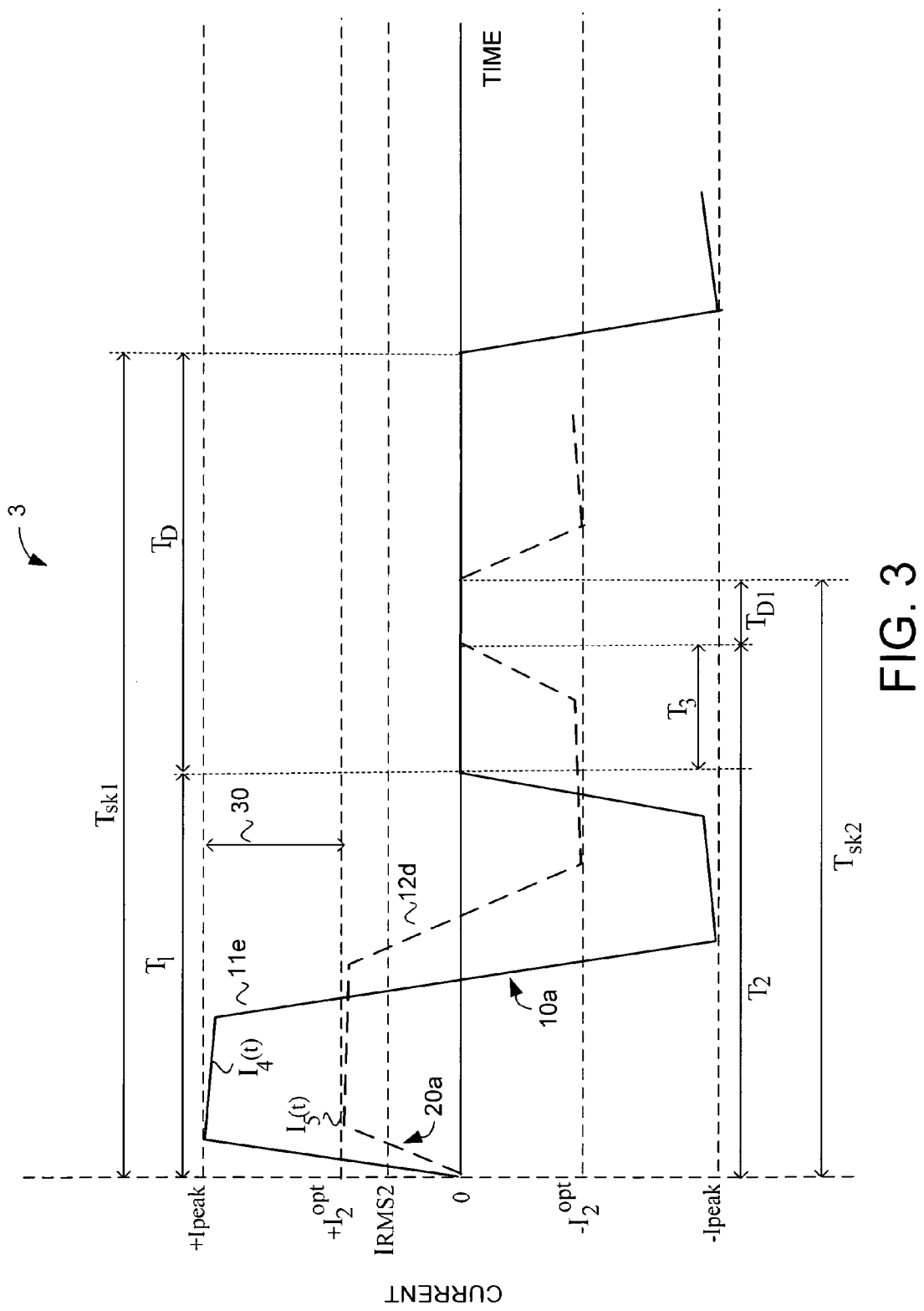
FIG. 3 illustrates an exemplary current graph corresponding to the operating modes of the present invention.

Next, the constraint of maintaining the same $I_{RMS2}$ profile for both seek profiles 10a and 20a, is to be satisfied. The $I_{RMS2}$ of the seek profile 10a is shown by the following Equation 2:

$$I_{RMS2} = \sqrt{\frac{\int_0^{T_{sk1}} I_4^2(t)\,dt}{T_{sk1}}} = \sqrt{\frac{\int_0^{T_1} I_4^2(t)\,dt}{T_{sk1}}} \qquad \text{(Eq. 2)}$$

wherein $T_{sk1}$ is defined by $T_1+T_D$ as shown in FIG. 3. The $I_{RMS2}$ of the seek profile 20a is shown by the following derivation process leading to Equation 3:

$$I_{RMS2} = \sqrt{\frac{\int_0^{T_{sk2}} I_5^2(t)\,dt}{T_{sk2}}} = \sqrt{\frac{\int_0^{T_2} I_5^2(t)\,dt}{T_{sk2}}} = \sqrt{\frac{\frac{1}{K^4}\int_0^{T_2} I_4^2\left(\frac{1}{K}t\right)dt}{T_{sk2}}}$$

performing substitution of variables $t=K\tau$ ($dt=K d\tau$), it follows that:

$$I_{RMS2} = \sqrt{\frac{\frac{1}{K^4} K \int_0^{T_2/K} I_4^2(\tau)\,d\tau}{T_{sk2}}} = \sqrt{\frac{\frac{1}{K^3}\int_0^{T_1} I_4^2(\tau)\,d\tau}{T_{sk2}}} \qquad \text{(Eq. 3)}$$

wherein $T_{sk2}$ is defined by $T_2+T_{D1}$ as shown in FIG. 3. Since the $I_{RMS2}$ of both seek profiles 10a and 20a are the same, Equation 2 can be equated with Equation 3 as shown by the following simplified Equation 4:

$$T_{sk2} = \frac{1}{K^3} T_{sk1} \qquad \text{(Eq. 4)}$$

Thus as shown by the foregoing Equations 1a–4, while decreasing the amplitude of the current $I_4(t)$ from $I_{peak}$ to $I_2$ increases the duration of the application of the resulting current $I_5(t)$ to VCM 122 (and thus the move time of the actuator 116) by a time period $T_3$ (from $T_1$ to $T_2$) the delay time $T_D$ is reduced even more significantly, such as from $T_D$ to $T_{D1}$, while maintaining the same $I_{RMS}$. In other words, the increase in $T_3$ is a lot smaller than the reduction of $T_D$ (to $T_{D1}$) because $T_D$ is reduced at a rate of $(K)^3$ while $T_3$ is increased at a rate of only K. Therefore, the overall seek time is reduced from $T_{sk1}$ to $T_{sk2}$.

Following the foregoing Equations 1 a–4, further scaling of the current $I_5(t)$ results in further increases in $T_2$ as well as further reductions to $T_{D1}$ until such time when $T_{D1}$ is effectively reduced to zero (i.e. when $T_{sk2}=T_2$) so that a second seek can begin immediately following the ending of a previous seek, such as shown by each of seeks 12d–12g in graph 1b of FIG. 2. This will provide an optimal seek time $T_{sk2}^{opt}$ for an $I_{RMS2}$ as shown by the following Equation 5:

$$T_{sk2}^{opt} = K_{opt} T \qquad \text{(Eq. 5)}$$

wherein $K_{opt}$ is the optimal K for reducing $T_{D1}$ to zero, thus reducing $T_{sk2}$ of Equation 4 to the $T_{sk2}^{opt}$ of Equation 5. $K_{opt}$ value can be determined by the above Equations 4 and 5 as shown below by the following Equations 6 and 7:

$$K_{opt} T_1 = \frac{1}{K_{opt}^3} T_{sk1} \qquad \text{(Eq. 6)}$$

$$K_{opt} = \sqrt[4]{\frac{T_{sk1}}{T_1}} = \frac{1}{\sqrt[4]{\alpha}} \qquad \text{(Eq. 7)}$$

wherein $\alpha$ is the duty cycle of seek profile 10a pre-defined as $T_1/T_{sk1}$ (i.e. $T_1/(T_1+T_D)$). Next, using the above-determined value of $K_{opt}$ in Equations 4–7, the optimal seek time $T_{sk2}^{opt}$ for $T_{sk2}$ can be determined in which the delay $T_D$ is effectively reduced to zero, as shown by the following Equation 8:

$$T_{sk2}^{opt} = \frac{1}{K_{opt}^3} T_{sk1} = \sqrt[4]{\alpha^3} T_{sk1} = \alpha^{0.75} T_{sk1} \qquad \text{(Eq. 8)}$$

Thus in view of Equation 8, the overall seek time is $\alpha^{0.75}$ times faster when using the seek profile 20a of the exemplary embodiment of the present invention. Returning to FIG. 2, an optimal $T_{AVG}$ of the second series of seeks is thus $T_{sk2}^{opt}$ which (according to Equation 8) comprises $T_{sk1}$ multiplied by the duty cycle a raised to the power of 0.75. In an exemplary embodiment, for duty cycle of approximately 52%, $T_{sk1}$ is multiplied by $(0.52)^{0.75}$ or approximately 0.61. Therefore by performing seek operations using the seek profile 20a, average seek times can be reduced by approximately 39%.

Using the above-determined value of $K_{opt}$ in Equations 1a–c, a corresponding scaling reduction factor of $I_{peak}$ to an optimal current amplitude $I_2^{opt}$ of the current $I_5(t)$ (thus now $I_5^{opt}(t)$) can also be determined by the following Equation 9:

$$I_5^{opt}(t) = \sqrt{\alpha}\, I_4(\sqrt[4]{\alpha}\, t) \qquad \text{(Eq. 9)}$$

$$I_2^{opt} = \max[I_5^{opt}(t)] = \sqrt{\alpha}\, \max[I_4(\sqrt[4]{\alpha}\, t)] = \sqrt{\alpha}\, I_{peak}$$

$$I_2^{opt} = \sqrt{\alpha}\, I_{peak}$$

As shown in FIG. 3, the scaling of the $I_{peak}$ current amplitude results in a reduction of the $I_{peak}$ by a current value 30. In an exemplary embodiment, for a duty cycle of approximately 52%, applied to an $I_{peak}$ current of 1 Amp, the $I_2^{opt}$ is 0.72 of the $I_{peak}$ or 0.72 amps. The $I_{peak}$ was therefore reduced by a current value 30 of 0.28 Amps, or by 28%.

One advantage of the foregoing feature of the present invention over the prior art is that a reduction in the overall seek time of a disk drive can be achieved compared to the use of delays $T_D$.

It should be noted that the various features of the foregoing embodiments were discussed separately for clarity of description only and they can be incorporated in whole or in part into a single embodiment of the invention having all or some of these features.

What is claimed is:

1. A disk drive comprising an actuator having a voice coil motor (VCM), a head mounted on the actuator, a disk comprising a plurality of tracks and a servo control system for moving the actuator to position the head over a track, the servo control system comprising:
   a first seek operating mode to move the actuator over a seek distance D in a seek time $T_1$, using a first seek profile for minimizing $T_1$ and wherein for a first repetitive series of seeks over distance D, the servo control system would require a delay time $T_D$ between seeks to control temperature rise in the VCM; and
   a second seek operating mode to move the actuator over the seek distance D in a second seek time $T_2$ using a second seek profile for limiting the temperature rise in the VCM, wherein for a second repetitive series of seeks over the seek distance D, a time average $T_{AVG}$ of the $T_2$ seek times is substantially less than $T_1+T_D$.

2. The disk drive of claim 1, wherein the servo control system is adapted to switch from the first seek operating mode to the second seek operating modes when the VCM reaches a first predetermined threshold temperature.

3. The disk drive of claim 2, wherein the servo control system is adapted to switch from the second seek operating mode to the first seek operating modes when the VCM reaches a second predetermined threshold temperature.

4. The disk drive of claim 1, wherein the second seek profile is generated based on the first seek profile.

5. The disk drive of claim 4, wherein the $T_{AVG}$ comprises $T_1+T_D$ multiplied by a factor, wherein the factor comprises a duty cycle corresponding to the first seek profile raised to the power of 0.75.

6. The disk drive of claim 5, wherein the duty cycle comprises $T_1$ divided by $T_1+T_D$.

7. The disk drive of claim 4, wherein the second seek profile is generated prior to the initialization of the disk drive.

8. The disk drive of claim 4, wherein the second seek profile is generated during the operations of the disk drive.

9. The disk drive of claim 1, wherein the first seek profile is characterized by a first operating current of a predetermined peak current amplitude provided to the VCM for a first predetermined time period during each seek in the first repetitive series of seeks.

10. The disk drive of claim 9, wherein the second seek profile is characterized by a second operating current provided to the VCM wherein the second operating current comprises a second current amplitude substantially equal to the predetermined peak current amplitude reduced by a current value.

11. The disk drive of claim 10, wherein the current value is generated based on a duty cycle corresponding to the first seek profile.

12. The disk drive of claim 11, wherein the current value is generated based on a square root of the duty cycle.

13. The disk drive of claim 9, wherein the second seek profile is characterized by a second operating current provided to the VCM wherein the second operating current comprises a second current amplitude substantially equal to the predetermined peak current amplitude scaled by a reduction factor.

14. The disk drive of claim 13, wherein the reduction factor is based on a duty cycle corresponding to the first seek profile.

15. The disk drive of claim 14, wherein the reduction factor comprises a square root of the duty cycle.

16. The disk drive of claim 9, wherein the predetermined peak current amplitude is a predetermined saturation current amplitude.

17. The disk drive of claim 9, wherein the second operating current is provided to the VCM for a second time period during each seek in the second repetitive series of seeks, wherein the second time period is substantially equal to first predetermined time period plus a second time period.

* * * * *